(12) United States Patent
Dobschal et al.

(10) Patent No.: US 10,718,956 B2
(45) Date of Patent: Jul. 21, 2020

(54) EYEGLASS LENS FOR AN IMAGING OPTICAL SYSTEM FOR PRODUCING A VIRTUAL IMAGE AND METHOD FOR PRODUCING SUCH AN EYEGLASS LENS

(71) Applicant: tooz technologies GmbH, Aalen (DE)

(72) Inventors: Hans-Juergen Dobschal, Kleinromstedt (DE); Karsten Lindig, Erfurt (DE); Ralf Meschenmoser, Essingen (DE); Timo Kratzer, Aalen (DE)

(73) Assignee: tooz technologies GmbH, Aalen (DE)

( * ) Notice: Subject to any disclaimer, the term of this patent is extended or adjusted under 35 U.S.C. 154(b) by 9 days.

(21) Appl. No.: 15/757,356

(22) PCT Filed: Aug. 29, 2016

(86) PCT No.: PCT/EP2016/070339
§ 371 (c)(1),
(2) Date: Mar. 3, 2018

(87) PCT Pub. No.: WO2017/037030
PCT Pub. Date: Mar. 9, 2017

(65) Prior Publication Data
US 2018/0252941 A1     Sep. 6, 2018

(30) Foreign Application Priority Data
Sep. 4, 2015   (DE) .................. 10 2015 114 833

(51) Int. Cl.
*G02C 7/02*  (2006.01)
*G02B 27/01* (2006.01)
(Continued)

(52) U.S. Cl.
CPC .......... *G02C 7/02* (2013.01); *B29D 11/00009* (2013.01); *B29D 11/00317* (2013.01);
(Continued)

(58) Field of Classification Search
None
See application file for complete search history.

(56) References Cited

U.S. PATENT DOCUMENTS

2006/0126181 A1   6/2006  Levola
2010/0171922 A1   7/2010  Sessner et al.
(Continued)

FOREIGN PATENT DOCUMENTS

CN     103930822 A     7/2014
DE    102012202695 A1  8/2013
(Continued)

OTHER PUBLICATIONS

International Preliminary Report on Patentability rendered by the International Bureau of WIPO for PCT/EP2016/070339 dated Mar. 15, 2018, 21 pages.
(Continued)

*Primary Examiner* — Darryl J Collins
*Assistant Examiner* — Journey F Sumlar
(74) *Attorney, Agent, or Firm* — Skaar Ulbrich Macari, P.A.

(57) ABSTRACT

In an eyeglass lens, an edge adjustment between an incoupling segment and an outcoupling structure can be provided by shaping of the inner surface. In the region of the eyeglass lens through which the eye looks for straight-ahead viewing, the inner surface substantially has a curvature that approximates the curvature of a typical inner surface of an eyeglass lens to such an extent that no perceptible optical imaging errors are induced by the inner surface when straight-ahead viewing. In the region of the edge adjustment, the inner surface has a shape that deviates to a greater extent from the curvature of the typical inner surface, which shape enables an imaging beam path coupled into the eyeglass lens by the incoupling segment to be directed to the outcoupling struc-
(Continued)

ture by reflections between the inner surface and the outer surface of the eyeglass lens.

19 Claims, 8 Drawing Sheets

(51) Int. Cl.
  *G02C 7/08*   (2006.01)
  *B29D 11/00*  (2006.01)
  *F21V 8/00*   (2006.01)
  *G02C 11/00*  (2006.01)
  *G02C 7/06*   (2006.01)

(52) U.S. Cl.
  CPC ........ *B29D 11/00932* (2013.01); *G02B 6/005* (2013.01); *G02B 6/0025* (2013.01); *G02B 27/0172* (2013.01); *G02C 7/086* (2013.01); *G02C 11/10* (2013.01); *G02B 2027/013* (2013.01); *G02B 2027/0123* (2013.01); *G02B 2027/0178* (2013.01); *G02C 7/061* (2013.01); *G02C 2202/20* (2013.01)

(56) References Cited

U.S. PATENT DOCUMENTS

| | | |
|---|---|---|
| 2010/0220295 A1 | 9/2010 | Mukawa et al. |
| 2012/0002294 A1 | 1/2012 | Dobschal et al. |
| 2012/0057122 A1 | 3/2012 | Guillot et al. |
| 2014/0347626 A1 | 11/2014 | Sahler et al. |
| 2014/0356608 A1 | 12/2014 | Lentes et al. |
| 2016/0178908 A1 | 6/2016 | Dobschal et al. |
| 2016/0299344 A1 | 10/2016 | Dobschal et al. |
| 2017/0108709 A1* | 4/2017 | Woodland ................. G02C 7/02 |

FOREIGN PATENT DOCUMENTS

| | | |
|---|---|---|
| DE | 102013214700 A1 | 1/2015 |
| DE | 102013223964 B3 | 5/2015 |
| WO | 2008090000 A1 | 7/2008 |
| WO | 2012088478 A1 | 6/2012 |
| WO | 2015044297 A1 | 4/2015 |
| WO | 2015075207 A1 | 5/2015 |

OTHER PUBLICATIONS

The International Search Report rendered by the International Searching Authority for PCT/EP2016/070339, dated Feb. 12, 2016, 3 pages.

Office Action to the corresponding German Patent Application rendered by the German Patent and Trademark Office (DPMA) dated May 4, 2016, 6 pages.

Office Action to the corresponding Chinese Patent Application rendered by the China National Intellectual Property Administration dated Mar. 26, 2019, 22 pages (including English translation).

\* cited by examiner

EYEGLASS LENS FOR AN IMAGING OPTICAL SYSTEM FOR PRODUCING A VIRTUAL IMAGE AND METHOD FOR PRODUCING SUCH AN EYEGLASS LENS

PRIORITY

This application claims the benefit of German Patent Application No. 102015114833.1, filed on Sep. 4, 2015, which is hereby incorporated herein by reference in its entirety.

FIELD

The present invention relates to an imaging optical unit for generating a virtual image and to a spectacle lens for an imaging optical unit of this type. In addition, the invention relates to a method for producing a spectacle lens for an imaging optical unit for generating a virtual image and to a spectacle lens semifinished product used in the method for producing the spectacle lens.

BACKGROUND

Data glasses are a special form of a head-mounted display. One conventional form of head-mounted displays uses screens that are worn in front of the eyes and present the user with computer-generated images or images taken by cameras. Such head-mounted displays are often voluminous and do not allow direct perception of the surroundings. In recent years, head-mounted displays have been developed which are able to present the user with an image taken by a camera or a computer-generated image without preventing direct perception of the surroundings. Such head-mounted displays, which will be referred to as data glasses hereinafter, enable this technology to be utilized in everyday life.

Data glasses can be provided in various types. One type of data glasses, which is distinguished in particular by its compactness and esthetic acceptance, is based on the principle of waveguiding in the spectacle lens. In this case, light generated by an image generator is collimated outside the spectacle lens and coupled in via the end face of the spectacle lens, from where it propagates via multiple reflection to a point in front of the eye. An optical element situated there then couples out the light in the direction of the eye pupil. In this case, the input coupling into the spectacle lens and the output coupling from the spectacle lens can take place either diffractively, reflectively or refractively. In the case of diffractive input or output coupling, diffraction gratings having approximately the same number of lines are used as input and output coupling elements, the greatly dispersive effects of the individual gratings being compensated for among one another. Input and output coupling elements based on diffraction gratings are described for example in US 2006/0126181 A1 and in US 2010/0220295 A1. Examples of data glasses comprising reflective or refractive input or output coupling elements are described in US 2012/0002294 A1.

Data glasses in which an imaging beam is guided with multiple reflection from an input coupling element to an output coupling element have in common the problem of the so-called "footprint overlap," irrespective of whether diffractive, reflective or refractive elements are used as input and output coupling elements. This problem, which limits the size of the field of view (FOV) and the size of the exit pupil of the data glasses at the location of the eyebox and on account of which a relatively high spectacle lens thickness is necessary, is explained in greater detail below with reference to FIGS. 1 and 2.

The eyebox is that three-dimensional region of the light tube in the imaging beam path in which the eye pupil can move, without vignetting of the image taking place. Since, in the case of data glasses, the distance of the eye with respect to the data glasses is substantially constant, the eyebox can be reduced to a two-dimensional eyebox that only takes account of the rotational movements of the eye. In this case, the eyebox substantially corresponds to the exit pupil of the data glasses at the location of the entrance pupil of the eye. The latter is generally given by the eye pupil. Although data glasses are a system with which an imaging beam path runs from the image generator to the exit pupil of the data glasses, for an understanding of the "footprint overlap" it is helpful to consider the beam path in the opposite direction, that is to say from the exit pupil to the image generator. Therefore, a light tube emanating from the exit pupil of the data glasses will be considered in the following explanations, wherein the boundaries of the light tube are determined by the field of view angles of the beams propagating from every point of the eyebox in the direction of the spectacle lens.

Figure 1:
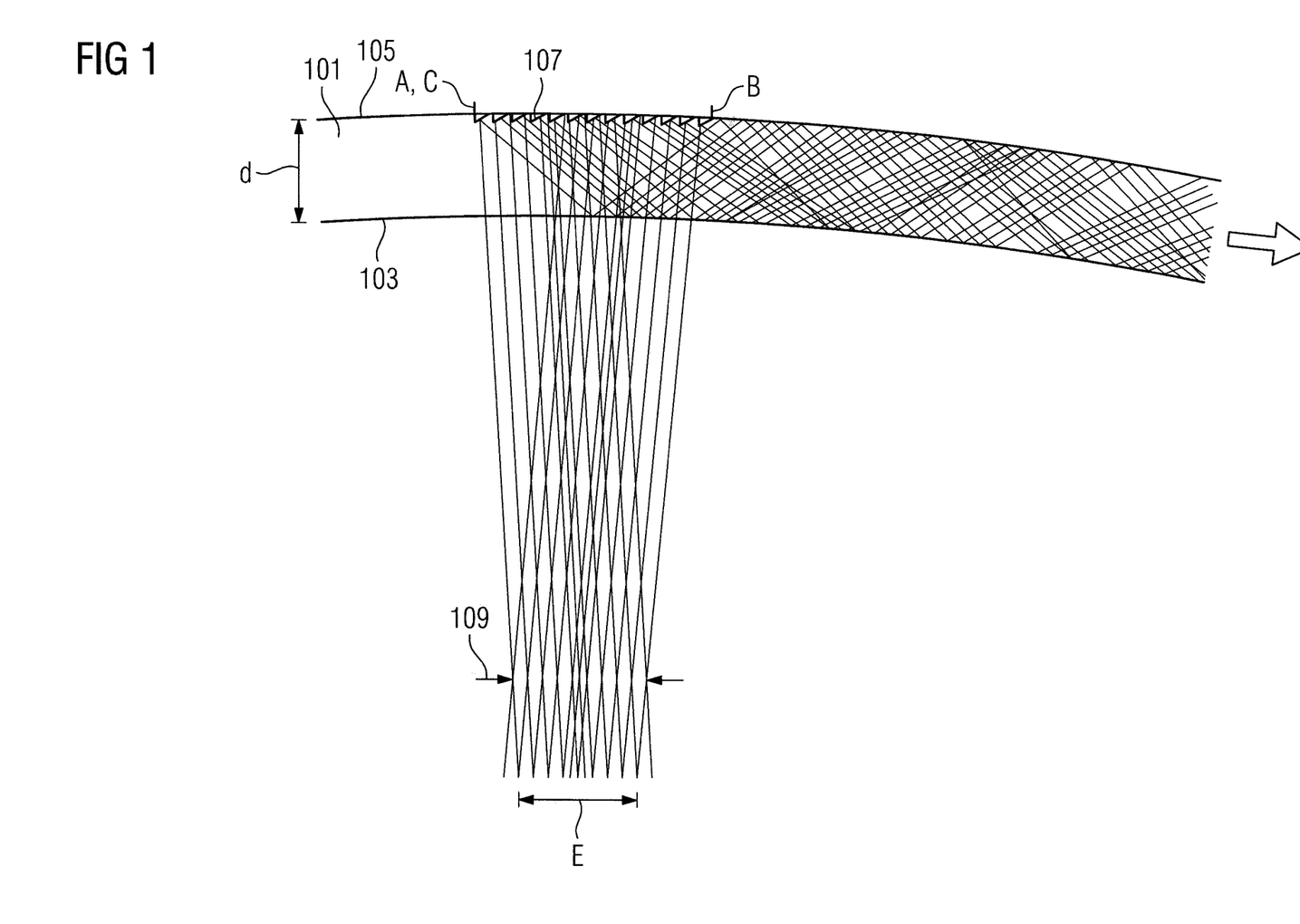
FIG. 1 shows a section from an imaging beam path in data glasses according to the prior art with a small field of view angle.

After refraction at the inner surface 103 of the spectacle lens 101, the rays in the light tube are incident on the outer surface 105 of the spectacle lens 101. The output coupling structure 107 is situated in said outer surface and extends in a horizontal direction from the point B to the point C. The distance between the points B and C is determined by the desired extent of the light tube, which in turn depends on the desired size of the eyebox 109 and the desired field of view angle. The field of view angle here is primarily the horizontal field of view angle, which concerns that angle relative to the axis of vision at which the horizontal marginal points of the image field are incident in the pupil. The axis of vision here denotes a straight line between the fovea of the eye (point of sharpest vision of the retina) and the midpoint of the image field. FIG. 1 illustrates the profile of the light tube given an eyebox diameter E and a thickness d of the spectacle lens 101 for a relatively small field of view angle. All rays of the light tube are diffracted or reflected from the output coupling structure 107 in the direction of the inner surface 103 of the spectacle lens 101 and from there are reflected back to the outer surface 105 of the spectacle lens 101, from where they are reflected back again onto the inner surface 103 of the spectacle lens 101. This reflection back and forth takes place until the input coupling element is reached, from where the light tube then progresses further in the direction of the image generator.

Figure 2:
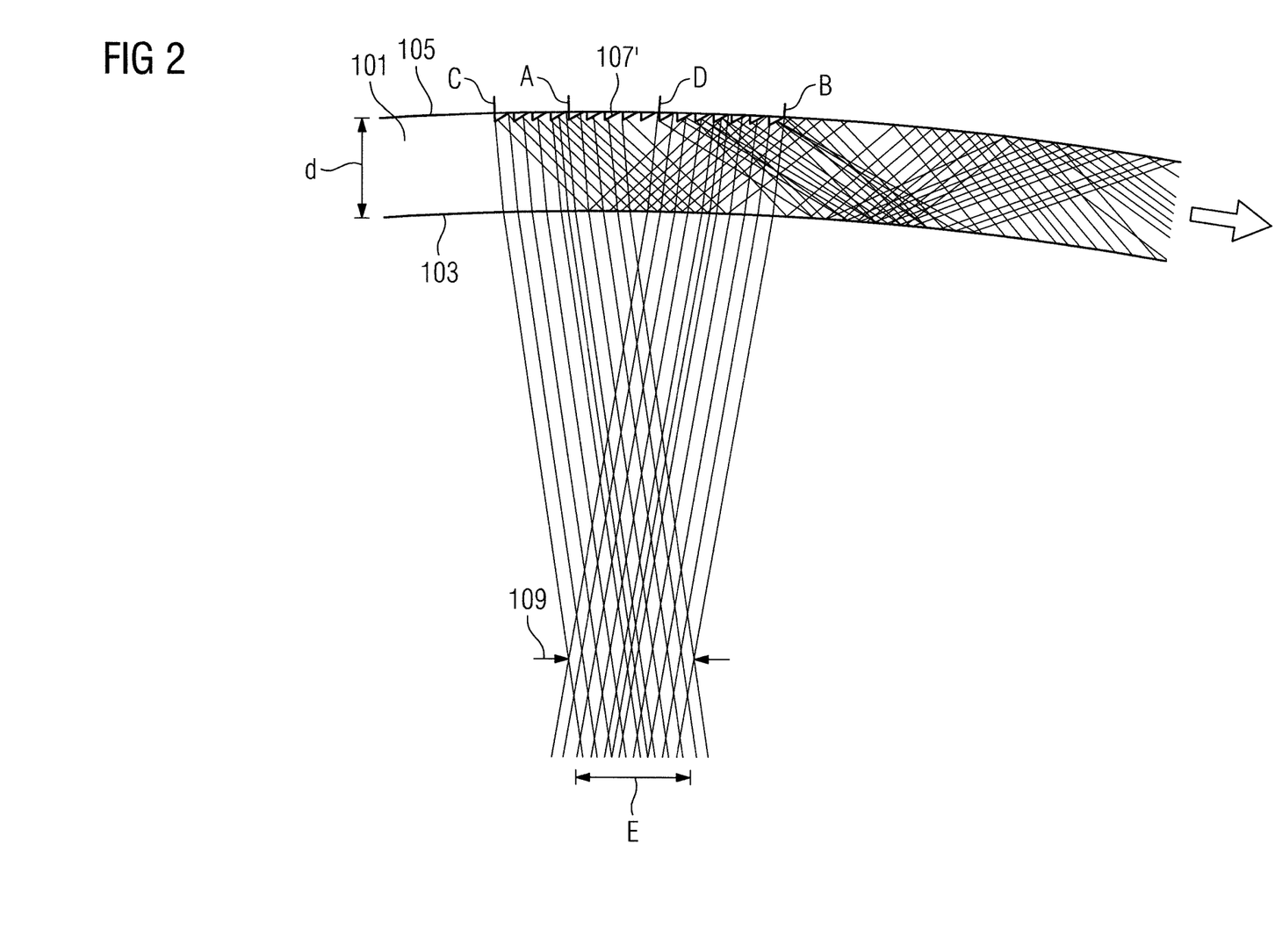
FIG. 2 shows a section from an imaging beam path in data glasses according to the prior art with a large field of view angle.

If, as illustrated in FIG. 1, the field of view angle is relatively small, the rays of the light tube, after the first reflection at the inner surface 103 of the spectacle lens 101, are incident on a region of the outer surface 105 of the spectacle lens 1 which lies outside the output coupling element 107 (in FIG. 1 on the right next to the point B). By contrast, if a large field of view angle is desired, as is illustrated in FIG. 2, a correspondingly enlarged output coupling structure 107' is necessary. However, this has the effect that rays of the light tube which are incident on that section of the output coupling structure 107' which is located between the points A and C, after the first reflection at the inner surface 103 of the spectacle lens 101, are reflected back onto a region of the outer surface 105 of the spectacle lens 101 in which the output coupling structure 107' is still situated. This region, referred to hereinafter as overlap region, is situated between the points B and D in FIG. 2.

Owing to the presence of the output coupling element, which may be a diffractive or reflective output coupling element in the illustration selected in FIG. 2, the rays reflected from the inner surface 103 of the spectacle lens 101 into the region between B and D are not reflected back in the direction of the inner surface 103, such that they are lost for imaging.

A similar problem also occurs if the diameter of the eyebox is increased rather than the field of view angle. In this case, too, there would be points A and C between which there is situated a region which reflects rays in the direction of the inner surface 103 of the spectacle lens 101 which are reflected back from there once again into a region of the output coupling structure 107' that is identified by the points B and D, and are therefore unusable for imaging. The same would also correspondingly hold true if the eyebox diameter E and the field of view angle were maintained and in return the thickness d of the spectacle lens were reduced. In other words, a sufficiently large eyebox diameter E in conjunction with a sufficiently large field of view angle can be achieved only with a certain minimum thickness d of the spectacle lens.

It should be pointed out once again at this juncture that the beam path was reversed for the above consideration, and that the actual beam path runs from the image generator into the exit pupil of the data glasses. This does not change anything about the fundamental consideration, however, since rays which come from the image generator and which are incident on the output coupling structure 107' in the region between the points B and D are not reflected into the exit pupil since they are not reflected back in the direction of the inner surface of the spectacle lens, which would be necessary, however, in order to reach the region of the output coupling structure 107' between the points A and C, from where they could be coupled out in the direction of the exit pupil.

WO 2015/075207 A1 describes an imaging optical unit for data glasses that have a spectacle lens having an input coupling section for coupling an imaging beam path into the spectacle lens, in which data glasses a peripheral thickening of the spectacle lens is present in the region of the input coupling section. With a peripheral thickening of this type, the above-described footprint overlap can be reduced. In order to implement the peripheral thickening, the otherwise spherical spectacle lens inner surface has a surface section that is embodied as a free-form surface. The spherical surface and the free-form surface are here defined in coordinate systems that are displaced and rotated with respect to one another and are produced in two different processing steps.

SUMMARY

An object of certain embodiments of the present invention is to provide an advantageous spectacle lens with periphery adaptation for an imaging optical unit for generating a virtual image of an initial image represented on an image generator. An object of certain embodiments of the present invention is to provide an advantageous imaging optical unit. An object of certain embodiments of the invention is to provide advantageous data glasses. An object of certain embodiments of the present invention is to provide an advantageous method for producing a spectacle lens with periphery adaptation for an imaging optical unit for generating a virtual image of an initial image represented on an image generator. An object of certain embodiments of the present invention is to provide an advantageous spectacle lens semifinished product, also referred to as a blank or puck, for producing a spectacle lens for an imaging optical unit for generating a virtual image of an initial image represented on an image generator.

The disclosure includes a spectacle lens, an imaging optical unit, data glasses, a method for producing a spectacle lens, and a spectacle lens semifinished product.

The disclosure includes a spectacle lens for an imaging optical unit for generating a virtual image of an initial image represented on an image generator has an inner surface, facing the eye, and an outer surface, facing away from the eye, and comprises an input coupling section for coupling an imaging beam path in between the inner surface and the outer surface and an output coupling structure, situated in the spectacle lens, for coupling the imaging beam path out of the spectacle lens in the direction of the eye. By way of example, the output coupling structure can be in the form of a Fresnel structure. The input coupling section is arranged in the spectacle lens such that an imaging beam path, coupled into the spectacle lens through the input coupling section, is guided to the output coupling structure by way of reflections between the inner surface and the outer surface.

Situated between the input coupling section and the output coupling structure in the spectacle lens is a periphery adaptation that is implemented by a corresponding shaping of the inner surface of the spectacle lens.

In that region of the spectacle lens through which the eye looks when it looks straight ahead, the inner surface has substantially a curvature that is approximated to the curvature of a typical inner surface of a spectacle lens with or without correction of a refractive error to such an extent that it does not induce any optical aberrations that are perceivable when looking straight ahead. The inner surface then has, in the region of the periphery adaptation, a shaping that deviates more strongly from the curvature of the typical inner surface and makes possible the guidance of an imaging beam path, which has been coupled into the spectacle lens through the input coupling section, by way of reflections between the inner surface and the outer surface of the spectacle lens to the output coupling structure. In the region of the periphery adaptation, the thickness of the spectacle lens can be greater or smaller than in the region of the output coupling structure. In a spectacle lens without correcting a refractive error, i.e. without refractive power, or a spectacle lens with negative refractive power, the thickness of the spectacle lens in the region of the periphery adaptation is generally greater than the thickness in the region of the output coupling structure, with the result that the periphery adaptation represents a peripheral thickening. In a spectacle lens with positive refractive power, the thickness of the spectacle lens in the region of the periphery adaptation can be less than the thickness in the region of the output coupling structure, with the result that the periphery adaptation in this case represents a thinner peripheral area.

The entire inner surface of the spectacle lens can be described by a single free-form surface, wherein the term free-form surface describes a non-rotation-symmetric surface. It is hereby possible firstly to produce the entire inner surface in a single processing step. In addition, the configuration as a single free-form surface allows the realization of a flowing transition from the inner surface in that region of the spectacle lens through which the eye looks when it looks straight ahead to the region of the periphery adaptation. To this end, in particular the entire free-form surface can be a continuously differentiable surface. In this case, the transition between the inner surface in that region through which the eye looks when it looks straight ahead and the region of the periphery adaptation is also described by the continuously differentiable function, as a result of which a particularly smooth transition can be realized, which makes possible a reduction in the footprint overlap. If the spectacle lens according to the invention has a positive refractive power, it can be advantageous if the spectacle lens inner surface is wavy in the region of the periphery adaptation to implement a suitable reflection angle for the imaging beam path.

In the prior art described in the introductory part, on the other hand, at best a continuous, but not a continuously differentiable transition between the spherical section of the spectacle lens inner surface and the periphery adaptation can be attained, because the spherical surface and the free-form surface are defined in different coordinate systems and for this reason cannot be realized by a common surface description. Accordingly, the two surfaces must be produced in different processing steps, which results in a transition between the spherical section of the spectacle lens inner surface and the periphery adaptation that is not continuously differentiable. The absence of the continuous differentiability, however, means that there is at least one kink, which has a disadvantageous influence on the optical properties of the transition.

The present invention contributes to overcoming the problem of ensuring that beams of the imaging beam path emanating from the output coupling structure must initially be entirely reflectively incident on the spherical region of the spectacle lens before they are incident, via a subsequent reflection at the spectacle lens outer surface, on the section formed by the free-form surface and must entirely touch it in the process. If part of the beam is reflected outside the region of the free-form surface, it can have the following negative effects:
1. In an image that is mirrored in, rays for the same field points can in each case emanate from the two different regions, which results in significant image aberrations and double images.
2. Those parts of a beam that do not follow the intended route between the free-form surface and the output coupling structure do not arrive in the eyebox, which results in aperture trimming.
3. Additional extraneous light paths that arrive in the image can be formed.

While the problem mentioned in item 2 merely entails aperture trimming and some resolution loss, item 1 in particular is disadvantageous because this case will be perceived strongly by the observer. Due to the realization of a continuously differentiable transition to the periphery adaptation, which is possible because of the description of the entire inner surface of the spectacle lens by a single free-form surface, it is possible to significantly reduce the described problem, because a kink at the boundary line to the free-form surface can be avoided.

As was already the case with reference to FIGS. 1 and 2, when considering the problem, to the solution of which the present invention makes a contribution, for better illustration of the situation a beam was considered that travels from the eye in the direction of the image generator, although the beam actually travels from the image generator to the eye.

In the context of the present invention, the entire outer surface of the spectacle lens can have a curvature that corresponds to the curvature of a typical spectacle lens outer surface with or without correction of a refractive error. In other words, the outer surface of the spectacle lens contributes as little to the production of the periphery adaptation as the inner surface of the spectacle lens in that region through which the eye looks when it looks straight ahead. The inner surface of the spectacle lens in that region through which the eye looks when it looks straight ahead and the entire outer surface of the spectacle lens can here have in particular a spherical curvature.

In a development of the spectacle lens according to certain embodiments of the invention, at least one further glass or plastics layer, in particular a glass or plastics layer that forms a partially reflective interface on the inner surface and/or the outer surface, is applied onto the inner surface and/or the outer surface. This makes it possible, for the reflection at the inner surface and/or the outer surface, for reflections at partially reflective surfaces to be used instead of total internal reflections as in the case of the inner surface and/or the outer surface bordering air. The glass or plastics layer can be applied onto the inner surface and/or the outer surface in the form of a coating, a film or an adhesively bonded glass or plastics element.

The disclosure also includes an imaging optical unit for generating a virtual image comprises an image generator for representing an initial image for a virtual image and a spectacle lens according to the invention. In addition, the imaging optical unit according to the invention can have an input coupling device, arranged at the input coupling section of the spectacle lens, for coupling the imaging beam path into the spectacle lens through the input coupling section. An input coupling device of this type can have in particular a prism structure. According to a further aspect of the invention, data glasses having an imaging optical unit of this type is additionally provided.

A method for producing a spectacle lens for an imaging optical unit for generating a virtual image of an initial image represented on an image generator is also provided. The method comprises the following steps:
providing a spectacle lens semifinished product, also referred to as a blank or puck, made of an organic or mineral glass material, wherein the spectacle lens semifinished product already has the output coupling structure, the outer surface of the spectacle lens to be produced, and an unfinished inner surface of the spectacle lens to be produced. The unfinished inner surface is here an inner surface that has a standard curvature. The spectacle lens semifinished product can be produced, for example, using a casting method, in particular using an injection molding method.
producing the spectacle lens from the spectacle lens semifinished product, wherein a CNC process is used to produce the inner surface of the spectacle lens from the unfinished inner surface of the spectacle lens semifinished product on the basis of stored CNC data that are defined for the entire inner surface in the same coordinate system.

Due to the fact that, according to the method, the entire inner surface of the spectacle lens is produced using a single CNC process on the basis of CNC data stored for the entire inner surface, it is made possible for a spectacle lens for an imaging optical unit that has a periphery adaptation and in which the transition between the periphery adaptation and the rest of the spectacle lens inner surface has a continuously differentiable curvature to be produced. The production method therefore makes it possible for spectacle lens inner surfaces with periphery adaptation to be produced without a kink or a visible edge in the transition between the periphery adaptation and the remaining regions of the spectacle lens. In contrast, spectacle lenses according to the prior art are produced either monolithically, i.e. they are produced completely in an injection molding method, or they are made from two parts, with each part being produced in a separate injection molding method. However, the monolithic production method requires extremely complex injection molding processes and generates stress birefringence, which results in limitations in the optical imaging. In addition, the number of manufacturing steps in the monolithic production is extremely large, as a result of which the process sequence is highly complex. In the two-part design, the complexity of the injection molding method and also the problems of stress birefringence and the complex production sequence are indeed reduced with respect to the monolithic design, but esthetic integration of the two components is not so easily possible. In addition, in the case of the two-part design, the spectacle lens inner surface in the region of the periphery adaptation and in the remaining region is typically made of two different parts that are assembled after separate manufacture. The result is an edge in the region of the transition between the two regions which contributes to the problem of the footprint overlap discussed in the introductory part.

By contrast, it is possible with the method disclosed to produce a spectacle lens for an imaging optical unit, in which neither a kink or edge is formed in the region of the transition between the spectacle lens inner surface in the region of the periphery adaptation and the spectacle lens inner surface in the remaining regions of the spectacle lens nor stress birefringence occurs.

In the context of the disclosed method, the blank can be produced, for example, using a casting process, in particular using an injection molding process. Since in the method only an unfinished inner surface needs to be produced with the casting process, the complexity of the casting process is significantly lower than the complexity of the casting process in the monolithic production.

The spectacle lens semifinished product may be selected from a specified number of standard spectacle lens semifinished products that differ from one another in that the outer surfaces and the unfinished inner surfaces of different standard spectacle lens semifinished products each have curvatures that differ from the curvatures of other standard spectacle lens semifinished products, wherein the curvatures are selected from a number of basic curvatures. The basic curvatures can be selected, for example, such that the refractive powers of the standard blanks in each case differ from one another by one diopter.

By providing a number of different standard spectacle lens semifinished products it becomes possible for spectacle lenses for imaging optical units with different corrections of refractive errors to be produced without large complexity. It is merely necessary to select the suitable spectacle lens semifinished product from an assortment of standard spectacle lens semifinished products. The selected standard spectacle lens semifinished product then already has the final outer surface which corresponds to one of the standard curvatures. Since the unfinished inner surface of the standard spectacle lens semifinished product already has a curvature that is already pretty close to the final curvature of the inner surface, it is possible to keep the processing complexity in the production of the inner surface of the spectacle lens from the unfinished inner surface relatively low. The exact shape of the spectacle lens inner surface outside the periphery adaptation can then be realized like the surface in the region of the periphery adaptation using the CNC process. It is thus possible with a manageable number of basic curvatures to provide a large number of effective surfaces for a correction of a refractive error. It is possible, for example, to produce 70% of known effective surfaces with only seven basic curvatures. If the number of basic curvatures is increased to 13, it is possible to cover all known effective surfaces. Each of the basic curvatures can here be assigned a specified shape of the unfinished inner surface in the region of the periphery adaptation that is adapted exactly to the respective basic curvature. It is additionally advantageous if an adapted output coupling structure for each basic curvature is provided in the standard spectacle lens semifinished products, since this likewise contributes to the quality of the imaging optical unit. In other words, it is particularly advantageous if a separate class of CNC data is provided for each basic curvature, wherein the classes of CNC data differ from one another at least by the definitions of the spectacle lens inner surface in the region of the periphery adaptation.

Edges and kinks at the transition between the inner surface in the region of the periphery adaptation and the remaining surface of the spectacle lens can be avoided particularly effectively if the CNC data that define an inner surface to be manufactured represent a surface that is continuously differentiable at each point. If only one continuous surface were to be defined, this would not rule out surfaces having kinks.

The production of the inner surface of the spectacle lens from the unfinished inner surface can comprise in particular a milling step, a pre-turning step, a fine turning step and a polishing step. These steps are already known from the production of the spectacle lens semifinished products, which means it is possible to use easily manageable technology.

The latter can additionally include a step of producing an input coupling device that can have in particular a prism structure. When producing the spectacle lens unfinished product or when producing the inner surface of the spectacle lens, it is advantageous in this case if an input coupling section for input coupling of the imaging beam path is also produced on the unfinished inner surface or the inner surface. Said input coupling section can be in particular a part of the inner surface in the region of the periphery adaptation or bordering the periphery adaptation. Producing an imaging optical unit from the spectacle lens semifinished product can then in particular also comprise the step of connecting the input coupling device to the input coupling section. In principle, it is, however, also possible for this step already to be performed when producing the spectacle lens semifinished product.

Also disclosed is a spectacle lens semifinished product, also referred to as a blank or puck, for producing a spectacle lens for an imaging optical unit for generating a virtual image of an initial image represented on an image generator. The spectacle lens semifinished product consists of a cast (mineral or organic) glass material. In addition, an output coupling structure, for example a Fresnel structure, an outer surface of the spectacle lens to be produced and an unfinished inner surface of the spectacle lens to be produced are present in the spectacle lens semifinished product.

The spectacle lens semifinished product can be used, as described above, in the method for producing a spectacle lens for an imaging optical unit. Advantages to be attained with the spectacle lens semifinished product and advantageous further configurations of the spectacle lens semifinished product have already been described with respect to the method according to the invention.

Further features, properties and advantages of the present invention will become apparent from the following description of exemplary embodiments with reference to the accompanying figures.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

The imaging optical unit according to the invention is described below on the basis of the example of data glasses equipped with such an imaging optical unit.

Figure 3:
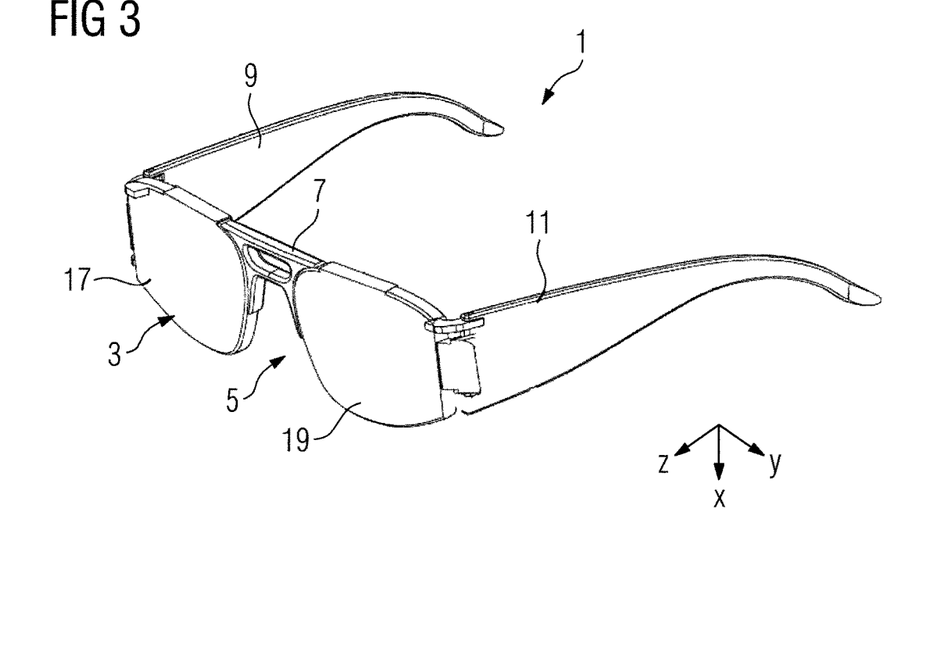
FIG. 3 shows data glasses in a perspective illustration.
Figure 4:
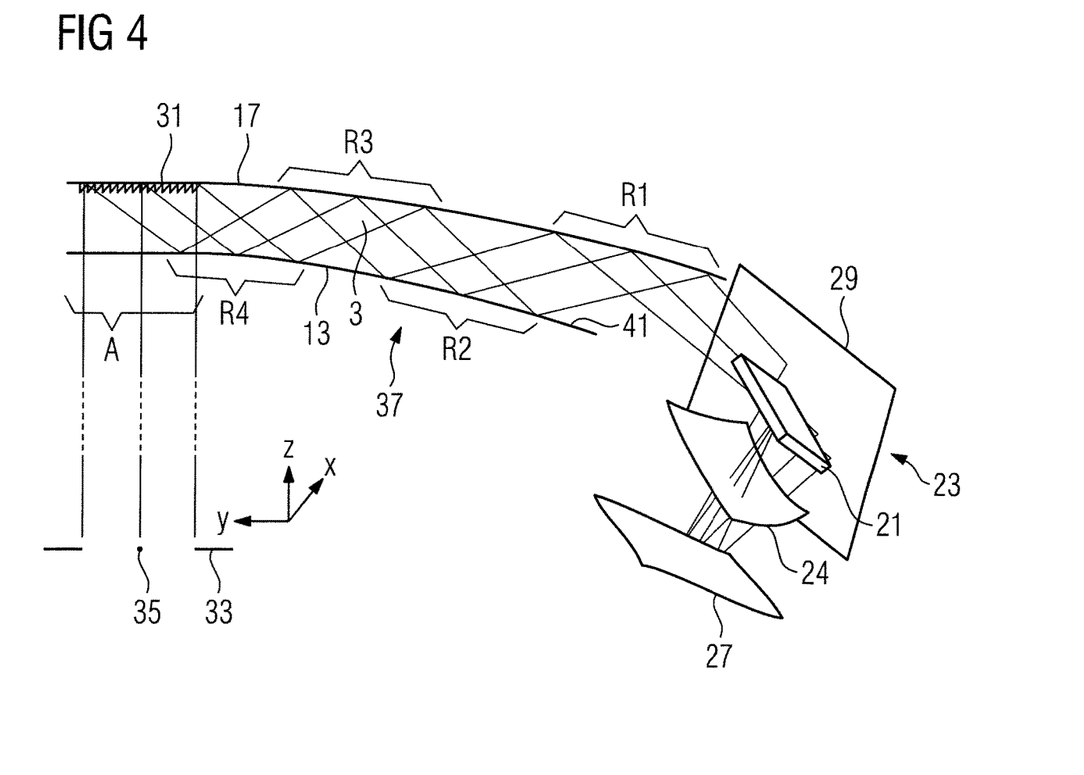
FIG. 4 shows a spectacle lens and an input coupling device of the data glasses from FIG. 1 in a schematic illustration.

Data glasses 1 equipped with an imaging optical unit according to the invention are shown in FIG. 3. The imaging optical unit itself, which substantially comprises one spectacle lens 3, is illustrated in FIG. 4, which shows a schematic illustration of the imaging optical unit for the purposes of explaining its function.

The data glasses 1 comprise two spectacle lenses 3, 5, which are held by a spectacle frame 7 with two spectacle earpieces 9, 11. The spectacle lenses each have an inner surface 13, 15 (visible in FIG. 4) facing the user's eye when the spectacles are being worn, and an outer surface 17, 19 (visible in FIGS. 3 and 4) facing away from the user's eye. In the present exemplary embodiment, an image generator 21 (shown in FIG. 4) is situated in the spectacle earpiece 9 or between the spectacle earpiece 9 and the spectacle lens 17, which image generator may be embodied for example as a liquid crystal display (LCD display), as a display based on light-emitting diodes (LED display) or as a display based on organic light-emitting diodes (OLED display). An input coupling device 23 is arranged between the image generator 21 and the spectacle lens 3, which input coupling device, in the present exemplary embodiment, has an entrance surface 24, a first mirror surface 27 and a second mirror surface 29 and is embodied as a prism of glass or transparent plastic, wherein the entrance surface 24 and the mirror surfaces 27, 29 are formed by surfaces of the prism. Like the prism forming the input coupling device 23, the spectacle lens 3 can also be produced from an organic glass, i.e. from a transparent plastic. Production from a mineral glass is likewise possible, however.

In the present exemplary embodiment, the block forming the input coupling device 23 and the spectacle lens 3 have been embodied as separate units and have subsequently been cemented together. The block forming the input coupling device 23 and the spectacle lens 3 can here be made from the same material or from different materials.

The input coupling device 23 serves not only for coupling the imaging beam path emanating from the image generator 21 into the spectacle lens 3 but also for collimating the divergent beams of the imaging beam path that emanate from the image points of the initial image represented by the image generator 21. For this purpose, in the present exemplary embodiment, the entrance surface 24, the first mirror surface 27 and the second mirror surface 29 have correspondingly curved surfaces, wherein the entrance surface 24 is embodied as an ellipsoidal surface and the two mirror surfaces 27, 29 are embodied in each case as hyperbolic surfaces. These curvatures represent the basic curvatures of said surfaces. In the present exemplary embodiment, free-form surfaces given by polynomials in x and y are superimposed on the basic curvatures of said surfaces 24, 27, 29, wherein x and y represent coordinates of a coordinate system whose z-axis corresponds to the optical axis of the imaging beam path. The z-coordinate of the surfaces in the imaging apparatus 23 are then defined by the sum of the z-coordinate given by a conical section surface (basic curvature) and a z-coordinate given by the polynomial (free-form surface).

The spectacle lens 3 and the input coupling device 23 together form the imaging optical unit of the data glasses 1, which generate a virtual image of the initial image represented on the image generator 21.

The input coupling device 23 couples the imaging beam path collimated by means of the entrance surface 24 and the two mirror surfaces 27, 29 into the spectacle lens 3 between the inner surface 13 and the outer surface 17 via an input coupling section of the spectacle lens 3. In the spectacle lens 3, the imaging beam path is then guided by means of reflections at the outer surface 17 and the inner surface 13 of the spectacle lens 3 to a Fresnel structure 31, by which the collimated imaging beam path is coupled out by being deflected in the direction of the inner surface 17 of the spectacle lens 3 in such a way that it emerges from the spectacle lens 3 through said inner surface refractively in the direction of the exit pupil 33 of the imaging optical unit. If the data glasses 1 are being worn, the exit pupil 33 is situated at the location of the pupil of the user's eye, of which the eye fulcrum 35 is illustrated in FIG. 4.

Figure 5:
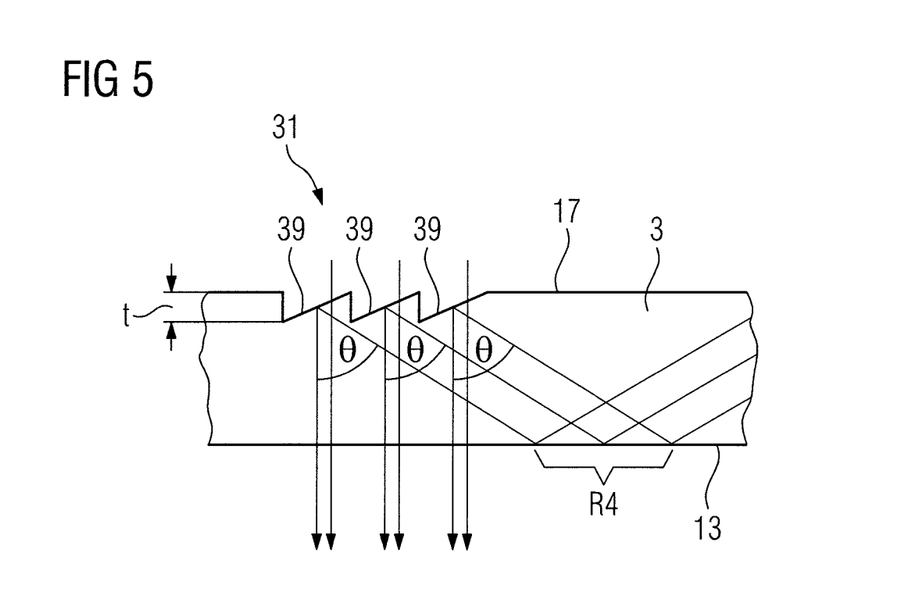
FIG. 5 shows an output coupling structure as can be used in the spectacle lens of FIG. 4.

A Fresnel structure 31 such as can be used in the imaging optical unit of the data glasses 1 is described in FIG. 5. The Fresnel structure 31 shown has facets 39, which, in the present exemplary embodiment, are oriented such that a zero ray of the imaging beam path that is incident on the facet 39 is reflected in the direction of the inner surface 17 of the spectacle lens 3 and the reflected zero ray encloses an angle θ of approximately 50 degrees with the incident zero ray. In the present exemplary embodiment, the facets 39 are partly reflectively coated, such that beams originating from the surroundings can pass through the partly reflectively coated facets 39 in the direction of the exit pupil 33. In this way, in the region of the exit pupil 33 a beam path is present in which the imaging beam path is superimposed with a beam path originating from the surroundings, such that a user of data glasses 1 provided with the imaging optical unit is given the impression that the virtual image floats in the surroundings.

On the path to the Fresnel structure 31, four reflections R1 to R4 take place in the spectacle lens 3 of the present exemplary embodiment after the input coupling of the imaging beam path, of which reflections the first R1 takes place at the outer surface 17 of the spectacle lens 3, the second reflection R2 takes place at the inner surface 13 of the spectacle lens 3, the third reflection R3 takes place once again at the outer surface 17 of the spectacle lens 3 and the fourth reflection R4, finally, takes place again at the inner surface 13 of the spectacle lens 3. The Fresnel structure 31 is situated in the outer surface of the spectacle lens, to where the imaging beam path is reflected by the fourth reflection R4. By means of the Fresnel structure 31, the imaging beam path is then coupled out of the spectacle lens 3 in the direction of the exit pupil of the imaging optical unit as described. FIG. 5 shows a center ray and two marginal rays of a divergent beam emanating from the image generator 21. As a result of the collimation by means of the input coupling device 23, forming a collimation optical unit, a largely collimated beam path is present in the spectacle lens 23 and is then coupled out as a largely collimated beam path by the Fresnel structure 31.

In the present exemplary embodiment, the reflections R1 to R4 at the inner surface 13 and the outer surface 17 of the spectacle lens are realized by total internal reflections at the inner surface 13 and the outer surface 17, which constitute in each case an interface with an optically less dense medium. In principle, however, they can also be realized by reflective coatings on the inner surface 13 and the outer surface 17, but that would make the production of the spectacle lens more complex and thus more expensive. In principle, the reflections could also take place at reflective layers situated in the interior of the spectacle lens 3, but in terms of production that would be even more complex than coating the inner and outer surfaces of the spectacle lens.

Where the second reflection R2 occurs on the inner surface 13 of the spectacle lens 3, the spectacle lens 3 is provided with a periphery adaptation, which in the present exemplary embodiment is in the form of a peripheral thickening 37. In other words, where the second reflection R2 occurs on the inner surface 13 of the spectacle lens 3, the distance between the inner surface 13 and the outer surface 17 in the present exemplary embodiment is greater than would be provided by the basic curvature of the spectacle lens 3. The periphery adaptation 37 makes possible a smaller footprint overlap in comparison with a spectacle lens 3 without periphery adaptation 37, which in turn enables a larger field of view (FOV) and also a larger eyebox, without the spectacle lens having to be made thicker as a whole. It should be noted that the spectacle lens 3 in the present exemplary embodiment is not embodied to correct a refractive error, and therefore the distance between the inner surface 13 and the outer surface 17 outside the peripheral thickening region is substantially constant. By contrast, if the spectacle lens 3 is intended to have a shape that corrects refractive errors, then the spectacle lens in the region of the periphery adaptation 37 can also be thinner than would be specified by the basic curvature of the spectacle lens. Whether the spectacle lens is thinner or thicker in the region of the periphery adaptation can here also depend on the degree of the refractive error to be corrected. In order to minimize the impairment of the view through the periphery adaptation 37, the periphery adaptation is situated in a peripheral region of the spectacle lens, that is to say in a region which corresponds to a large visual angle and therefore lies at the periphery of a user's field of view, where it is only slightly disturbing, if at all.

Figure 6:
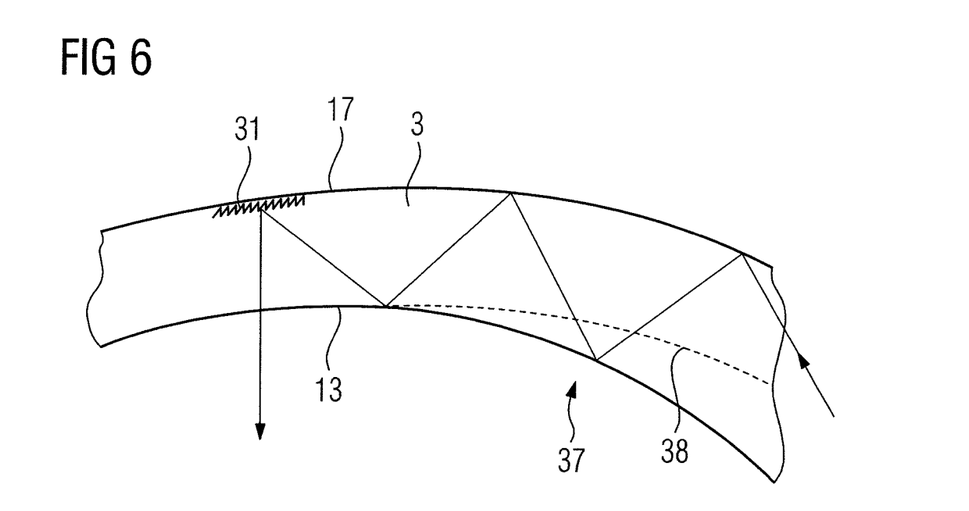
FIG. 6 shows the process of the periphery adaptation in a spectacle lens with negative refractive power.
Figure 7:
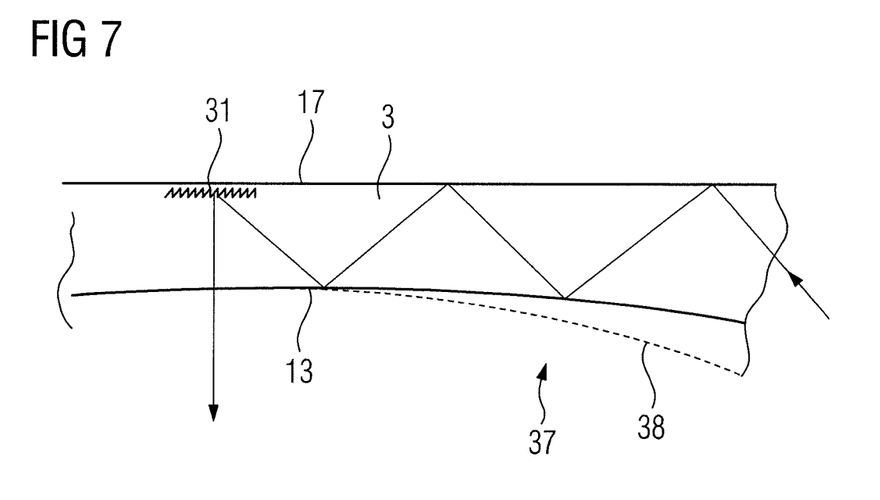
FIG. 7 shows the process of the periphery adaptation in a spectacle lens with neutral refractive power.
Figure 8:
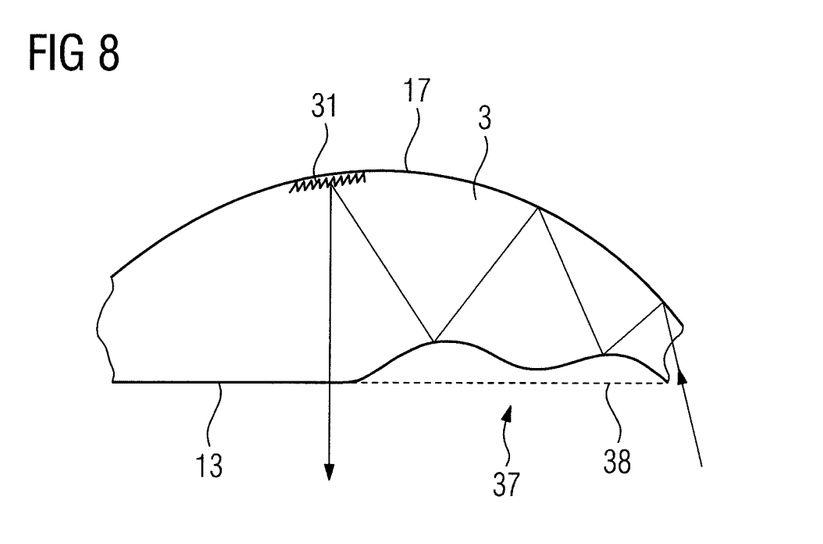
FIG. 8 shows the process of the periphery adaptation in a spectacle lens with positive refractive power.

FIGS. 6 to 8 show schematic illustrations of the profile of the periphery adaptation for a spectacle lens without refractive power (FIG. 6), a spectacle lens with negative refractive power (FIG. 7) and a spectacle lens with positive refractive power (FIG. 8). The figures each show a spectacle lens 3 and the output coupling structure 31 that is arranged therein and the imaging beam path that is reflected multiple times between the spectacle lens outer side 17 and the spectacle lens inner side 13. As can be seen in the figures, the spectacle lens inner sides 13 each have a periphery adaptation 37, wherein in the spectacle lens without correction of a refractive error (without refractive power), shown in FIG. 6, the periphery adaptation 37 is embodied in the form of a peripheral thickening. The profile of the spectacle lens inner surface 13 as it would be without the peripheral thickening is shown in a dashed line as the profile 38.

In the case of a spectacle lens 3 with negative refractive power, as is schematically illustrated in FIG. 7, the thickness of the spectacle lens in the peripheral region of the spectacle lens 3 is entirely sufficient. The periphery adaptation 37 formed for minimizing the footprint overlap in this case reduces the thickness of the spectacle lens in the peripheral region. The profile 38 of the inner surface 13 of the spectacle lens 3 as it would be without the periphery adaptation 37 is here also shown by a dashed line.

A spectacle lens 3 with a positive refractive power is shown in FIG. 8. As in the spectacle lens with negative refractive power shown in FIG. 7, the periphery of the spectacle lens in the case of the spectacle lens 3 with positive refractive power does not need to be thickened by the periphery adaptation 37. Rather, the spectacle lens 3 has become thinner in the region of the periphery adaptation 37. The profile 38 of the spectacle lens inner surface 13 as it would be without the periphery adaptation 37 is shown in FIG. 8, like in FIGS. 6 and 7, by way of a dashed line. The profile of the spectacle lens inner surface 13 in the region of the periphery adaptation 37 in the present example is wavy. This serves for obtaining a suitable reflection angle in the respective reflection region.

Figure 9:
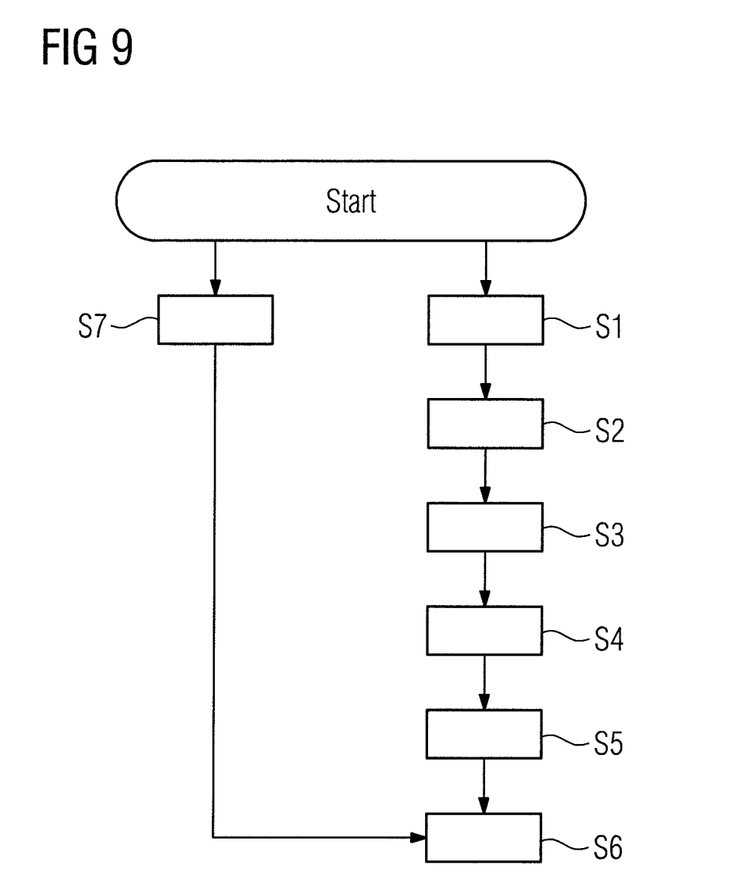
FIG. 9 shows a flow chart for producing a spectacle lens for an imaging optical unit from a spectacle lens semifinished product.
Figure 10:
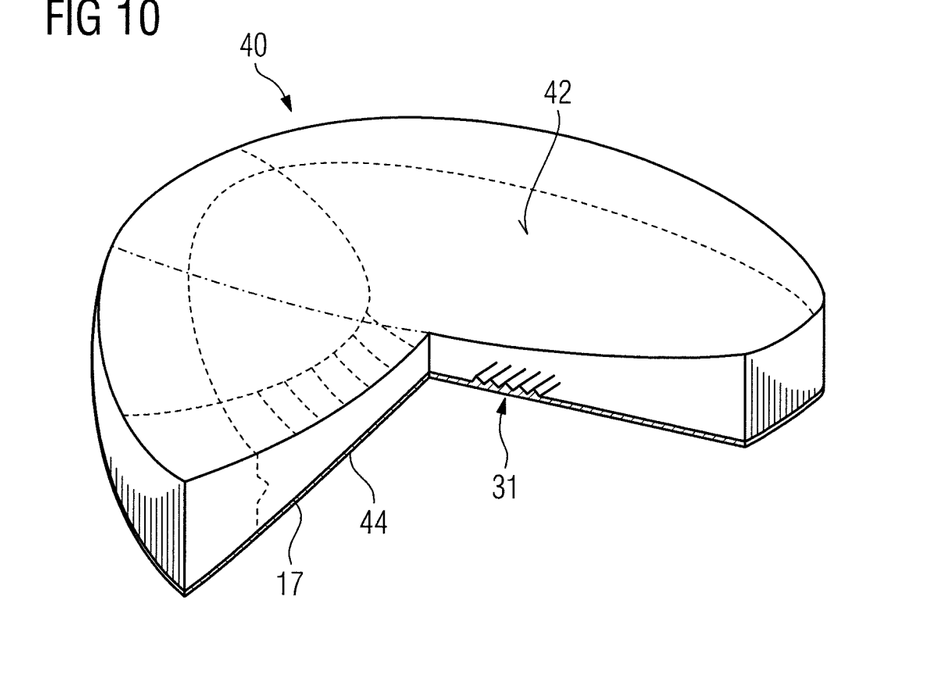
FIG. 10 shows an example of a spectacle lens semifinished product before a spectacle lens is produced.
Figure 11:
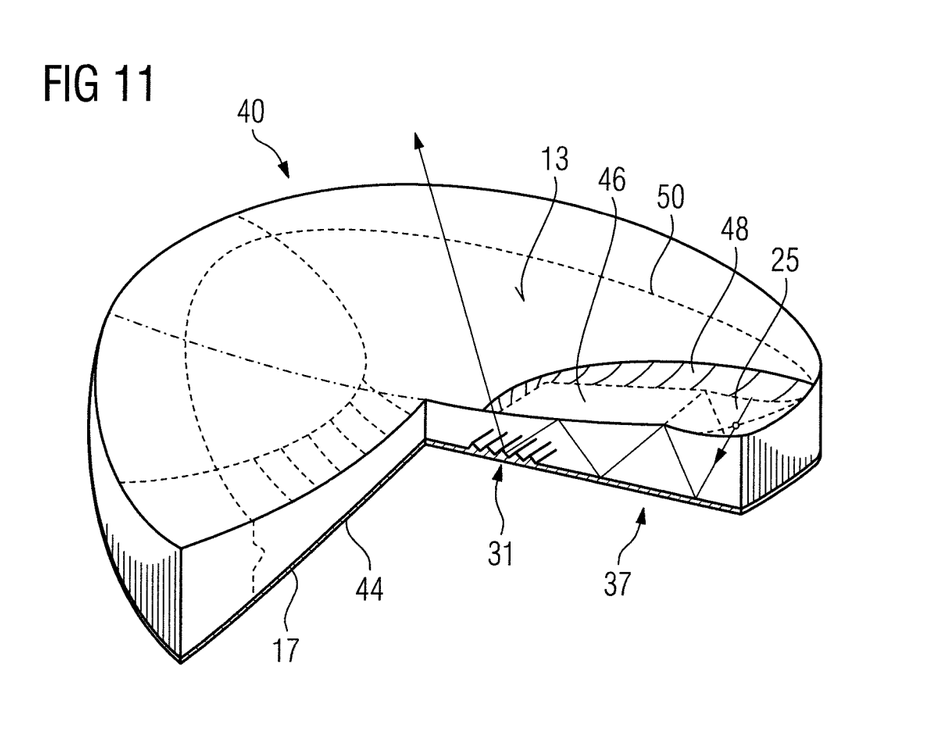
FIG. 11 shows the spectacle lens semifinished product from FIG. 10 after the spectacle lens inner surface has been produced.

An exemplary embodiment for a method for producing a spectacle lens according to the invention will be described below with reference to FIGS. 9 to 11. FIG. 9 shows the method in the form of a flow chart.

A spectacle lens semifinished product consisting of organic glass material is used in the present exemplary embodiment for producing the spectacle lens. After the method is started, a spectacle lens semifinished product suitable for the spectacle lens to be produced is selected from a supply of standard spectacle lens semifinished products. One example of a spectacle lens semifinished product 40 of this type is illustrated in FIG. 10. The spectacle lens semifinished product 40 already has the finished spectacle lens outer surface 17 and has already been provided with the output coupling apparatus 31. The output coupling apparatus 31 is embodied in the form of a Fresnel structure covered with adhesive. In addition, a film 44 is applied onto the spectacle lens outer surface 17 including the Fresnel structure that is covered with adhesive. Moreover, the spectacle lens semifinished product has an unfinished inner surface 42, from which the spectacle lens inner surface 13 will be produced later. In addition, a coating is applied (not illustrated) onto the outer surface 17 of the spectacle lens semifinished product over the film. Said coating can comprise a hard lacquer that is applied, for example, in an immersion coating or spin coating method. In addition, the coating can comprise a final anti-reflective coating. The unfinished inner surface 42 of the spectacle lens semifinished product 40 does not contain a coating because said surface will be machined as part of the production process for the spectacle lens. In the described form, the spectacle lens semifinished product is largely protected against damage, soiling and contact-bonded particles. However, it may also additionally be provided with a protective film.

As part of the present exemplary embodiment, a spectacle lens semifinished product 40 that is suitable for the production of the spectacle lens is selected from a supply of different standard spectacle lens semifinished products. The spectacle lens semifinished products in the supply differ from one another substantially in the basic curvatures of the spectacle lens outer surface and the unfinished inner surface. The exact shape of a spectacle lens semifinished product is here defined substantially by five parameters, specifically the radius of curvature of the spectacle lens outer surface, the radius of curvature of the spectacle lens inner surface, the diameter of the spectacle lens semifinished product, the thickness of the spectacle lens semifinished product, that is to say the distance between the outer surface and the unfinished inner surface, and the thickness at the periphery of the spectacle lens semifinished product, that is to say the distance between the outer surface and the unfinished inner surface of the spectacle lens semifinished product at its outer periphery. The radius of curvature of the spectacle lens outer surface, the diameter of the spectacle lens semifinished product, the thickness of the spectacle lens semifinished product and the thickness of the spectacle lens semifinished product at its periphery are specified as parameters for different standard spectacle lens semifinished products. The radii of curvature of the unfinished inner surfaces 42 of the standard spectacle lens semifinished products are then calculated from the respective four specified parameter values.

In the present example, the standard spectacle lens semifinished products are graded such that they differ from one another in each case by a refractive power of one diopter. Effective ranges of ±1 diopter can be produced here, with the result that transitions, so-called blendings, between the later periphery adaptation region and the remaining regions of the finished spectacle lens can be designed to be smoother and more esthetically pleasing.

With seven different basic curvatures it is possible to produce standard spectacle lens semifinished products that can correct 70% of common refractive errors. With thirteen basic curvatures, all refractive errors can be corrected.

After a suitable spectacle lens semifinished product for the concrete spectacle lens to be produced has been selected in step S1 (for example with respect to any refractive errors to be corrected), the production of the actual spectacle lens 3 takes place, wherein, as an essential process of the production method, a CNC process is used to produce the spectacle lens inner surface 13 from the unfinished inner surface 42 (step S2). To this end, the spectacle lens semifinished product 40 is mounted on what is known as a block piece, wherein the connection between the outer surface 17 of the spectacle lens semifinished product 40, which is provided with a hard protective coating and possibly a protective film, and the block piece is produced by way of a low-melting metal alloy or an adhesive pad. Alternatively, the connection can also be produced by way of a vacuum clamping method. The spectacle lens semifinished product 40 that has been thus prepared is then placed in a CNC machine, where the spectacle lens inner surface 13 is machined from the unfinished inner surface 42.

The shape of the spectacle lens inner surface 13 to be produced is here stored in the CNC machine in the form of CNC data that represent the shape of the entire inner surface 13 in the same coordinate system. Due to the fact that the CNC data represent the shape of the entire inner surface 13 in a single coordinate system, it is possible using the CNC process to produce the entire spectacle lens inner surface, that is to say the spectacle lens inner surface 13 in the region of the periphery adaptation 37 and in the remaining regions of the spectacle lens 3, in one work process that may comprise a plurality of process steps. If, on the other hand, a different CNC data set is used for the spectacle lens inner surface 13 in the region of the periphery adaptation 37 than for the remaining regions of the spectacle lens inner surface 13, as in the prior art, said regions must be produced in a different work process than the spectacle lens inner surface in the region of the periphery adaptation, which results in a transition between the periphery adaptation region and the remaining regions of the spectacle lens inner surface not being possible without a kink being formed at that boundary line at which the coordinate system of the periphery adaptation region borders the coordinate system of the remaining regions of the spectacle lens. Such a kink would have a negative effect with respect to the footprint overlap. In order to avoid such a kink, the finished spectacle lens inner surface 13 must be a continuously differentiable surface, which can be obtained by specifying the shape of the entire spectacle lens inner surface 13 to be produced in a single CNC data set such that a boundary line between two regions that are produced with different CNC data sets is avoided.

The machining work process, used in step S2, for producing the spectacle lens inner surface 13 from the unfinished inner surface 42 can comprise a plurality of process steps. It typically comprises a milling step, a pre-turning step, a fine turning step and a polishing step, wherein the amount of removed material decreases with each of these steps. At the end of the polishing step, the spectacle lens inner surface 13 defined in the CNC data has then been produced. As part of the process step S2, producing the regions of the spectacle lens inner surface 13 that are not part of the region of the periphery adaptation 37 also comprises producing the entrance surface 25 for the imaging beam path.

The spectacle lens semifinished product 40 obtained after the process step S2 is then subjected to further processing steps, in which a hard coating is applied (step S3), for example using spin coating as is described for example in DE 10 2012 202 695 A1, and finally an anti-reflective coating is applied for the purposes of providing an anti-reflective effect (S4). During application of the anti-reflective coating, the input coupling surface 25 is covered so that the latter does not receive an anti-reflective coating. The anti-reflective coating would disturb the coupling of the imaging beam path into the light channel. The semifinished product after the machining process and the coating processes are finished is illustrated in FIG. 11. This figure illustrates the input coupling surface 25, the light channel 46 situated in the region of the periphery adaptation 37, and the transition 48 between the input coupling surface 25 and the light channel surface 46, on the one hand, and the remaining spectacle lens inner surface, on the other. Additionally illustrated is the profile of the imaging beam path through the entrance surface 25 and the light channel 46 formed in the region of the periphery adaptation 37 to the output coupling structure 31 and, from there, in the direction of the eye.

After the coatings have been applied in steps S2 and S4, the spectacle lens semifinished product is cut along the line 50 in order to produce the spectacle lens 3 from the spectacle lens semifinished product 40 (step S5). This terminates the production of the spectacle lens 3.

In order to produce from the spectacle lens 3 an imaging optical unit for data glasses, a prism, which constitutes an input coupling device for coupling the imaging beam path into the light channel 46 of the spectacle lens, can be adhesively bonded, in a further step S6, to the input coupling surface 25 in the spectacle lens via a special prism surface. Already provided at the end of step S6 is a complete imaging optical unit that can ultimately be installed in data glasses.

In the present example, a separate CNC data set for each standard spectacle lens semifinished product is provided that contains an inner surface 42, adapted to the respective standard spectacle lens semifinished product, in the region of the light channel 46, i.e. also in the region of the periphery adaptation 37. Accordingly, each CNC data set also contains an input coupling surface 25 that is adapted to the respective standard spectacle lens semifinished product. Moreover, a separate prism for coupling the imaging beam path into the light channel 46 is provided in the present exemplary embodiment for each standard spectacle lens semifinished product. The method illustrated in FIG. 9 therefore in the present case also comprises a step S7 of selecting the prism that matches the selected standard spectacle lens semifinished product.

In data glasses, typically one of the two spectacle lenses is embodied as an imaging optical unit. The other spectacle lens is then a normal spectacle lens, that is to say a spectacle lens without a light channel and without an input coupling surface and without an output coupling structure. A periphery adaptation is consequently not necessary. Producing a spectacle lens of this type can be effected with a method that is very similar to the one described, wherein the standard spectacle lens semifinished products used for this spectacle lens do not incorporate a light channel and do not contain an output coupling structure. In addition, the CNC data for such a spectacle lens contain merely data that define a standard inner surface with or without correction of a refractive error and without a periphery adaptation.

Figure 12:
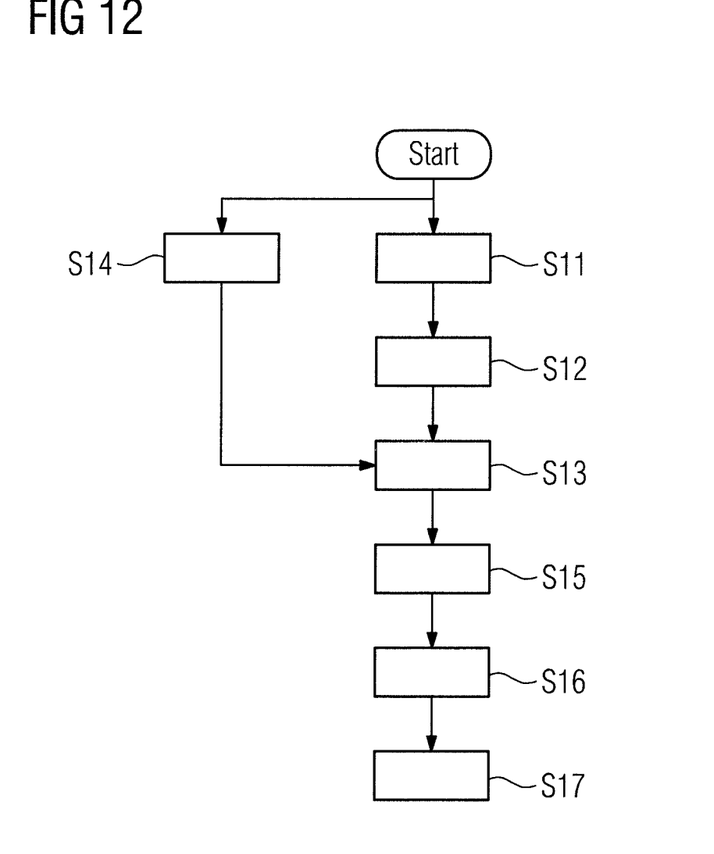
FIG. 12 shows a flow chart for producing a standard spectacle lens semifinished product and the associated input coupling structure.

A method for producing a standard spectacle lens semifinished product 40 will be described below with reference to FIG. 12. After the start of the method, a blank for the spectacle lens semifinished product is formed using a casting method (step S11). In the present exemplary embodiment, organic glass material is used, that is to say plastics material, from which the blank is formed using an injection molding method. The blank resulting from injection molding has a spectacle lens outer surface, the shape of which corresponds to the final shape of the spectacle lens outer surface 17, and an unfinished inner surface 42, from which later the spectacle lens inner surface 13 will be machined, as has been described with respect to FIG. 9. In addition, already formed with the injection molding method is the output coupling structure which, in the present exemplary embodiment, is pressed into the outer surface by the mold surface of the casting mold in the form of a Fresnel structure. In step S12, a coating is applied on the Fresnel structure that has been pressed into the outer surface in order to partly reflectively coat the facets of the Fresnel structure. Next, in step S13, a spherically formed film of a similar or preferably identical material as the material used during injection molding is applied onto the outer surface of the spectacle lens semifinished product, wherein the Fresnel structure is filled in with an adhesive. To this end, the film is wetted in a vacuum metering method with epoxy adhesive and applied without bubbles onto the outer surface of the spectacle lens semifinished product. The production of the spherically formed film is illustrated in FIG. 12 as step S14. As an alternative to the application of the spherically formed film, the Fresnel structure that has been impressed in the outer surface and been coated, can be filled in with a filling piece in step S13.

The filling piece in this case is produced in a separate injection molding step, which takes the place of step S14, and is adapted to the impressed Fresnel structure such that, once the filling piece has been placed into the coated Fresnel structure, the curvature of the outer surface of the spectacle lens semifinished product is continued in the region of the Fresnel structure. If the method for producing the spectacle lens semifinished product is used to produce a multiplicity of standard spectacle lens semifinished products that differ from one another in terms of the curvatures of their outer surfaces and possibly in the form of the Fresnel structure, the respectively matching filling piece is produced for each standard spectacle lens semifinished product.

After the spherically formed film has been applied onto the outer surface of the spectacle lens semifinished product, a hard coating is applied in step S15. The application of the hard coating can take effect, for example, using an immersion coating process or a spin coating process. Finally, in step S16, an anti-reflective coating is applied to achieve an anti-reflective effect on the outer surface. The application of the anti-reflective coating can be performed using a suitable coating process, for example using spin coating or physical vapor deposition (PVD). If further processing of the spectacle lens semifinished product, as has been described with reference to FIG. 9, is not immediately performed, it can be stored in step S17 for later use in a method for producing a spectacle lens. There is an option here to provide the outer surface of the spectacle lens with a protective film before storage.

It is also possible to produce a spectacle lens semifinished product for the second spectacle lens in data glasses using a very similar method. A method for producing such a spectacle lens would not contain steps S12, S13 and S14. In addition, the mold used in the injection molding process S11 would have different mold surfaces for molding the outer surface 17 and the unfinished inner surface 42, because no Fresnel structure 31 needs to be formed in the outer surface 17 and no periphery adaptation region 37 needs to be incorporated in the unfinished inner surface 42. As for the rest, the method would not differ from the method described with reference to FIG. 12.

The present invention has been described in detail with the aid of exemplary embodiments for explanation purposes. It goes without saying, however, that deviations from the exemplary embodiments are possible. For example, the spectacle lens semifinished product can be produced alternatively from a mineral glass material rather than an organic glass material, as in the exemplary embodiment. The casting processes required herefor would of course differ from those used when casting an organic glass material. However, a person skilled in the art can easily see which modifications of the casting process are necessary if a mineral glass material is to be used rather than an organic glass material.

It is also not absolutely necessary to configure the output coupling structure in the form of a Fresnel structure. In principle, there is also the possibility to use, for example, a diffractive output coupling structure for output coupling rather than the reflective Fresnel structure. Neither is it necessary for a supply of standard spectacle lens semifinished products to be created. For example, the spectacle lens production method described with reference to FIG. 9 can be performed directly after the production method for a spectacle lens semifinished product described with reference to FIG. 12. In this case, a spectacle lens semifinished product that is suitable for the spectacle lens production method is produced specifically for the spectacle lens to be produced. Therefore, the present invention is not intended to be defined by the exemplary embodiments, but the appended claims.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A spectacle lens for an imaging optical unit for generating a virtual image of an initial image represented on an image generator, comprising:
    an inner surface that faces an eye of the user;
    an outer surface that faces away from the eye of the user;
    an input coupling section for coupling an imaging beam path in between the inner surface and the outer surface; and
    an output coupling structure for coupling the imaging beam path out of the spectacle lens in the direction of the eye,
    wherein the input coupling section is arranged in the spectacle lens such that an imaging beam path, coupled into the spectacle lens through the input coupling section, is guided to the output coupling structure by way of reflections between the inner surface and the outer surface of the spectacle lens,
    wherein, situated between the input coupling section and the output coupling structure in the spectacle lens is a periphery adaptation that is implemented by a corresponding shaping of the inner surface,
    wherein in a region of the spectacle lens through which the eye looks when the user is looking straight ahead, the inner surface has substantially a curvature that is approximated to the curvature of a typical inner surface of a spectacle lens with or without correction of a refractive error to such an extent that it does not induce any optical aberrations that are perceivable when looking straight ahead, and, in the region of the periphery adaptation, the inner surface has a shaping that deviates more strongly from the curvature of the typical inner surface and makes possible the guidance of an imaging beam path, which has been coupled into the spectacle lens through the input coupling section, by way of reflections between the inner surface and the outer surface of the spectacle lens to the output coupling structure, and
    wherein an entirety of the inner surface of the spectacle lens is described by a single free-form surface; and
    wherein the inner surface is wavy in the region of the periphery adaptation.

2. The spectacle lens of claim 1, wherein the entire free-form surface is a continuously differentiable surface.

3. The spectacle lens of claim 1, wherein the entire outer surface has a curvature that corresponds to the curvature of a typical outer surface of a spectacle lens with or without correction of a refractive error.

4. The spectacle lens of claim 1, wherein both the inner surface in the region of the spectacle lens through which the eye looks when the user is looking straight ahead and the entire outer surface of the spectacle lens have a spherical curvature.

5. The spectacle lens of claim 1, wherein the input coupling section is situated in the region of the periphery adaptation or bordering the periphery adaptation on the inner surface of the spectacle lens.

6. The spectacle lens of claim 1, wherein at least one further glass or plastics layer is applied on at least one of the inner surface and the outer surface.

7. The spectacle lens of claim 6, in which the glass or plastics layer is a glass or plastics layer that forms a partially reflective interface on at least one of the inner surface and the outer surface.

8. An imaging optical unit for generating a virtual image, comprising:
    an image generator that represents an initial image for the virtual image; and
    a spectacle lens as claimed in claim 1.

9. The imaging optical unit of claim 8, wherein an input coupling device for coupling the imaging beam path into the spectacle lens through the input coupling section is arranged at the input coupling section of the spectacle lens.

10. The imaging optical unit of claim 9, in which the input coupling device has a prism structure.

11. Data glasses having an imaging optical unit which is configured as an imaging optical unit as claimed in claim 8.

12. A method for producing the spectacle lens of claim 1, the method comprising:
    providing a spectacle lens semifinished product from a glass material, wherein the spectacle lens semifinished product already has the output coupling structure, the outer surface of the spectacle lens to be produced and an unfinished inner surface of the spectacle lens to be produced; and
    producing the spectacle lens of claim 1 from the spectacle lens semifinished product, wherein a CNC process is used to produce the inner surface of the spectacle lens from the unfinished inner surface of the spectacle lens semifinished product on the basis of stored CNC data that are defined for the entire inner surface in a common coordinate system.

13. The method of claim 12, further comprising selecting the spectacle lens semifinished product from a specified number of standard spectacle lens semifinished products that differ from one another in that the outer surfaces and the unfinished inner surfaces of the different standard spectacle lens semifinished products each have curvatures that differ from the curvatures of other standard spectacle lens semifinished products, wherein the curvatures are selected from a number of basic curvatures.

14. The method of claim 13, wherein a refractive power of each of the standard spectacle lens semifinished products differs incrementally from one another by one diopter.

15. The method of claim 13, wherein for each standard spectacle lens semifinished product, a separate class of CNC data is provided, wherein the classes of CNC data differ from one another at least by the definitions of the spectacle lens inner surface in the region of the periphery adaptation.

16. The method of claim 12, wherein the CNC data define a surface that is continuously differentiable at each point.

17. The method of claim 12, further comprising producing an input coupling section for input coupling of an imaging beam path either in the production of the spectacle lens semifinished product or when the inner surface of the spectacle lens from the unfinished inner surface is produced.

18. The method of claim 17, further comprising producing an input coupling device, wherein producing the spectacle lens from the spectacle lens semifinished product includes connecting the input coupling device to the input coupling section.

19. A spectacle lens semifinished product for producing the spectacle lens of claim 1 for an imaging optical unit for generating a virtual image of an initial image represented on an image generator, wherein the spectacle lens semifinished product consists of a cast glass material, and an output coupling structure, an outer surface and an unfinished inner surface of the spectacle lens to be produced.

* * * * *